United States Patent
Zhao et al.

(10) Patent No.: US 12,420,809 B2
(45) Date of Patent: Sep. 23, 2025

(54) METHOD AND DEVICE FOR INTEGRATED CONTROL OF HANDLING STABILITY OF DISTRIBUTED DRIVE ELECTRIC VEHICLES

(71) Applicant: CHANG'AN UNIVERSITY, Xi'an (CN)

(72) Inventors: Xuan Zhao, Xi'an (CN); Shu Wang, Xi'an (CN); Rong Huang, Xi'an (CN); Yisong Chen, Xi'an (CN); Kai Zhang, Xi'an (CN); Yilin He, Xi'an (CN)

(73) Assignee: CHANG'AN UNIVERSITY, xi'an (CN)

( * ) Notice: Subject to any disclaimer, the term of this patent is extended or adjusted under 35 U.S.C. 154(b) by 0 days.

(21) Appl. No.: 19/021,378

(22) Filed: Jan. 15, 2025

(65) Prior Publication Data
US 2025/0153720 A1    May 15, 2025

Related U.S. Application Data

(63) Continuation of application No. PCT/CN2024/105711, filed on Jul. 16, 2024.

(30) Foreign Application Priority Data

Oct. 26, 2023    (CN) .......................... 202311402934.3

(51) Int. Cl.
*B60W 40/10*    (2012.01)
*B60W 50/00*    (2006.01)

(52) U.S. Cl.
CPC ........ *B60W 40/10* (2013.01); *B60W 50/0098* (2013.01); *B60W 2050/0037* (2013.01);
(Continued)

(58) Field of Classification Search
CPC ............. B60W 40/10; B60W 50/0098; B60W 2050/0037; B60W 2520/10;
(Continued)

(56) References Cited

U.S. PATENT DOCUMENTS

2013/0144479 A1* 6/2013 Ito .......................... B60L 3/0076
701/22
2013/0283900 A1* 10/2013 Engstrom ......... G01M 17/0074
73/115.05
(Continued)

FOREIGN PATENT DOCUMENTS

CN    101537828 A    9/2009
CN    107415939 A    12/2017
(Continued)

*Primary Examiner* — Peter D Nolan
*Assistant Examiner* — Wae L Louie

(57) ABSTRACT

A method for integrated control of handling stability of a distributed drive electric vehicle is provided, in which a Magic Formula tire model is subjected to piecewise linear fitting to obtain a piecewise affine tire model; a hybrid logical dynamic model is established based on the piecewise affine tire model; a hierarchical integrated control strategy is adopted to obtain an upper-layer hybrid model predictive controller and a lower-layer four-wheel torque optimal allocation controller, so as to calculate an additional yaw moment, an additional front-wheel steering angle and a wheel drive torque. Related devices for implementing the integrated control method are also provided.

8 Claims, 6 Drawing Sheets

(52) U.S. Cl.
CPC ..... *B60W 2520/10* (2013.01); *B60W 2520/14* (2013.01); *B60W 2520/20* (2013.01); *B60W 2520/30* (2013.01); *B60W 2540/18* (2013.01)

(58) Field of Classification Search
CPC ......... B60W 2520/14; B60W 2520/20; B60W 2520/30; B60W 2540/18
See application file for complete search history.

(56) References Cited

U.S. PATENT DOCUMENTS

| | | | | |
|---|---|---|---|---|
| 2016/0116367 | A1* | 4/2016 | Pfister | G01M 7/02 73/664 |
| 2019/0210581 | A1* | 7/2019 | Saito | B60T 13/686 |
| 2020/0142405 | A1* | 5/2020 | Havens | G05D 1/0088 |
| 2020/0257291 | A1* | 8/2020 | Zhang | B60W 40/101 |
| 2020/0317048 | A1* | 10/2020 | Kasaiezadeh Mahabadi | B60K 17/3515 |
| 2021/0171050 | A1* | 6/2021 | Han | G01M 17/04 |
| 2021/0206379 | A1* | 7/2021 | Bobier-Tiu | B60T 8/17551 |
| 2021/0260932 | A1* | 8/2021 | Fulker | G01B 11/22 |

FOREIGN PATENT DOCUMENTS

| | | |
|---|---|---|
| CN | 109733474 A | 5/2019 |
| CN | 109977449 A | 7/2019 |
| CN | 110395120 A | 11/2019 |
| CN | 111497826 A | 8/2020 |
| CN | 112346337 A | 2/2021 |
| CN | 112793430 A | 5/2021 |
| CN | 114670808 A | 6/2022 |
| CN | 115447566 A | 12/2022 |
| CN | 117400951 A | 1/2024 |
| DE | 102008032754 A1 | 7/2009 |
| JP | 2016127637 A | 7/2016 |
| KR | 20160099872 A | 8/2016 |
| WO | 2023036029 A1 | 3/2023 |

\* cited by examiner

METHOD AND DEVICE FOR INTEGRATED CONTROL OF HANDLING STABILITY OF DISTRIBUTED DRIVE ELECTRIC VEHICLES

CROSS-REFERENCE TO RELATED APPLICATIONS

This application is a continuation of International Patent Application No. PCT/CN2024/105711, filed on Jul. 16, 2024, which claims the benefit of priority from Chinese Patent Application No. 202311402934.3, filed on Oct. 26, 2023. The content of the aforementioned application, including any intervening amendments thereto, is incorporated herein by reference in its entirety.

TECHNICAL FIELD

This application relates to control of vehicles' handling stability, and more particularly to a method and device for integrated control of handling stability of distributed drive electric vehicles.

BACKGROUND

When traveling at a high speed or on a low-adhesion road surface, the vehicle may deviate from the target trajectory due to understeering or oversteering. Under these circumstances, the vehicle is highly prone to instability, particularly when affected by external environmental factors or instability in the vehicle's state parameters. A distributed drive electric vehicle, whose wheels are independently driven by multiple wheel hub motors or wheel-side motors, has a compact configuration, which enhances both mechanical efficiency and control precision. These structural characteristics facilitate promoting the continued advancement of active safety technologies.

Currently, it has been demonstrated that the tire force plays a critical role in the dynamics researches of distributed drive electric vehicles. In the vehicle stability researches, the control accuracy of the controller is dependent from the establishment of tire force models to a certain extent. Under extreme conditions, when the tire enters nonlinear or even saturated regions, the decision-making and control accuracy of vehicle stability control will be greatly affected if the linear characteristics of the tire are taken into consideration. Additionally, the control system also struggles with a poor response speed due to the large computational complexity, which hinders the improvement of control precision.

SUMMARY

In view of this, an object of the present disclosure is to provide a method and device for integrated control of handling stability of a distributed drive electric vehicle to overcome the defects in the prior art that the control system suffers from large computational burdens, leading to a poor response rate and great difficulty in improving the control precision.

Technical solutions of the present disclosure are described as follows.

In a first aspect, this application provides a method for integrated control of handling stability of a distributed drive electric vehicle, comprising:
(1) subjecting a Magic Formula tire model to piecewise linear fitting to obtain a piecewise affine tire model;
(2) constructing a hybrid logical dynamic model based on the piecewise affine tire model through a mixed logical dynamic modeling method;
(3) establishing an upper-layer hybrid model predictive controller based on the hybrid logical dynamic model, and calculating an additional yaw moment and an additional front-wheel steering angle based on the upper-layer hybrid model predictive controller; and
(4) establishing a lower-layer four-wheel torque optimal allocation controller based on the additional yaw moment, and calculating a wheel drive torque based on the lower-layer four-wheel torque optimal allocation controller.

In some embodiments, the Magic Formula tire model is constructed based on a stiffness factor, a shape factor, a model peak factor, a model curvature factor and a tire side-slip angle.

In some embodiments, the hybrid logical dynamic model is constructed through steps of:
(1) calculating an ideal reference state parameter of the distributed drive electric vehicle based on real-time state information of the distributed drive electric vehicle;
(2) constructing an error state equation based on the ideal reference state parameter; and
(3) constructing the hybrid logical dynamic model based on the error state equation and the piecewise affine tire model.

In some embodiments, the real-time state information comprises speed, yaw rate, center-of-mass side-slip angle and front-wheel steering angle.

In some embodiments, the additional yaw moment and the additional front-wheel steering angle are calculated based on the upper-layer hybrid model predictive controller through a mixed-integer quadratic programming algorithm.

In some embodiments, the wheel drive torque is calculated through steps of:
calculating a wheel longitudinal force based on the lower-layer four-wheel torque optimal allocation controller with minimization of a tire load factor as an optimization objective; and
calculating the wheel drive torque based on the wheel longitudinal force.

In some embodiments, the wheel longitudinal force is calculated based on the lower-layer four-wheel torque optimal allocation controller with minimization of the tire load factor as the optimization objective through an active set method.

In a second aspect, this application provides a system for implementing the method provided above, comprising:
a first construction module;
a second construction module;
a first calculation module; and
a second calculation module;
wherein the first construction module is configured to perform piecewise linear fitting on the Magic Formula tire model to construct the piecewise affine tire model;
the second construction module is configured to construct the hybrid logical dynamic model based on the piecewise affine tire model through the mixed logical dynamic modeling method;
the first calculation module is configured to establish the upper-layer hybrid model predictive controller based on the hybrid logical dynamic model, and calculate the additional yaw moment and the additional front-wheel steering angle based on the upper-layer hybrid model predictive controller; and the second calculation module is configured to establish the lower-layer four-wheel torque optimal allocation controller based on the additional yaw moment, and calculate the wheel drive torque using the lower-layer four-wheel torque optimal allocation controller.

In a third aspect, this application provides a device, comprising:

a memory; and a processor;

wherein the memory is configured for storing a computer program; and the processor is configured for executing the computer program to implement the method described above.

In a fourth aspect, this application provides a computer-readable storage medium, wherein the computer-readable storage medium is configured for storing a computer program; and the computer program is configured to be executed by a processor to implement the method described above.

Compared to the prior art, the present disclosure has the following beneficial effects.

The method for integrated control of handling stability of a distributed drive electric vehicle is provided, in which the Magic Formula tire model is subjected to piecewise linear fitting to obtain the piecewise affine tire model. The hybrid logical dynamic model is constructed based on the piecewise affine tire model. A hierarchical integrated control strategy is adopted to establish the upper-layer hybrid model predictive controller and the lower-layer four-wheel torque optimal allocation controller, such that the additional yaw moment and the additional front-wheel steering angle and the wheel drive torque can be calculated, thereby achieving handling stability control for distributed drive electric vehicles. The piecewise affine model can expand on traditional linear characteristics, accurately simulate the nonlinear behaviors present in the system, and efficiently handle linear threshold events and mode switching. The hybrid logical dynamic model integrates logic, dynamics and constraints, efficiently addressing the coupling of continuous and discrete variables in hybrid systems. The method provided herein can accurately describe the variation in tire lateral forces during vehicle operation, while simultaneously reducing the computational burdens of the control system and improving the response speed.

Preferably, in the present disclosure, the wheel drive torque is calculated based on the lower-layer four-wheel torque optimal allocation controller with minimization of the tire load factor as the optimization objective, thereby further enhancing the vehicle's lateral traction capability under extreme operating conditions and improving its lateral disturbance resistance during operation.

DETAILED DESCRIPTION OF EMBODIMENTS

Figure 5:
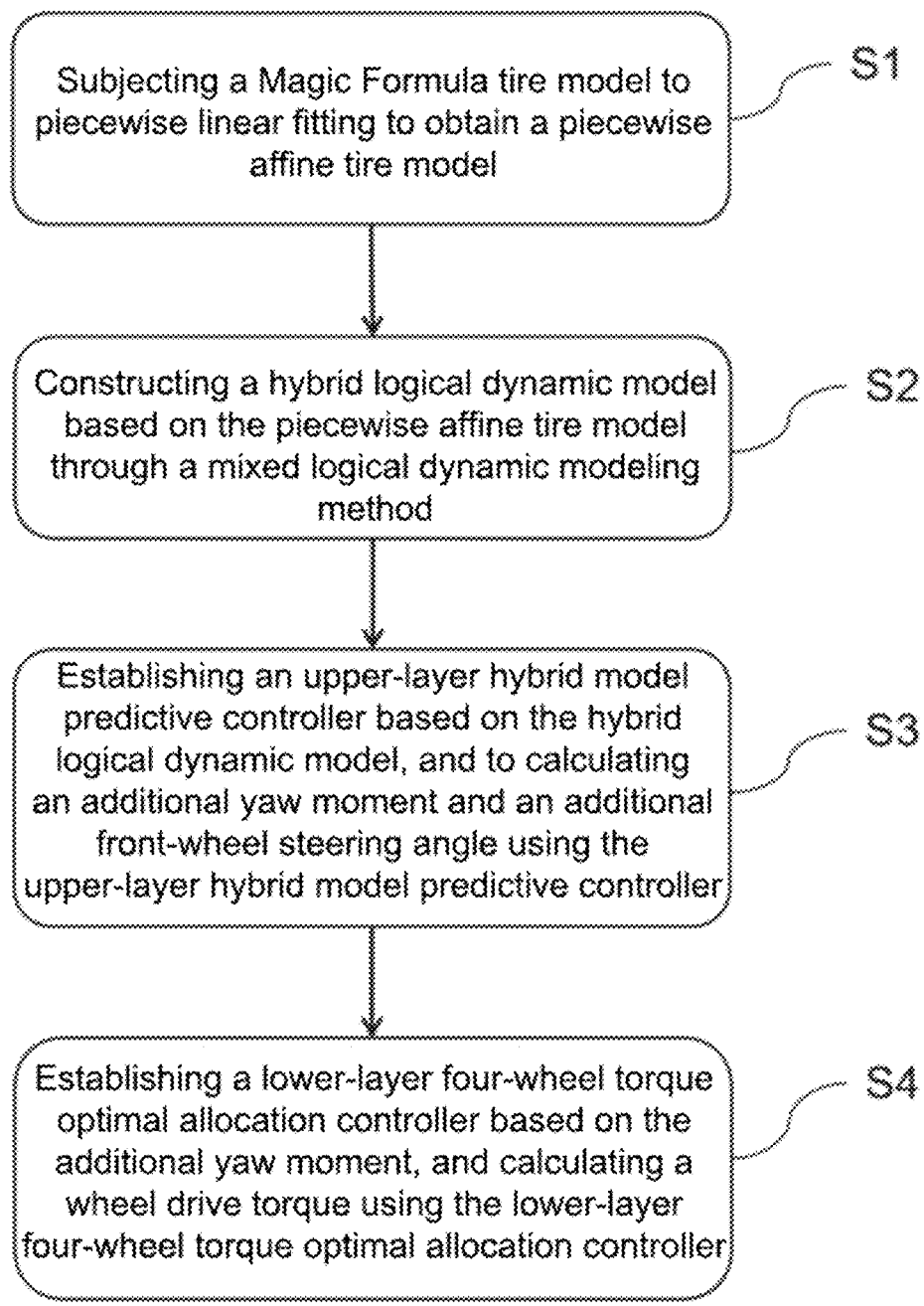
FIG. 5 is a flowchart 2 of the method for integrated control of handling stability of the distributed drive electric vehicle according to an embodiment of the present disclosure.

As shown in FIG. 5, the present disclosure provides a method for integrated control of handling stability of a distributed drive electric vehicle, which is performed as follows.

Step (1) A Magic Formula tire model is subjected to piecewise linear fitting to obtain a piecewise affine tire model.

The Magic Formula tire model is constructed based on a stiffness factor, a shape factor, a model peak factor, a model curvature factor and a tire side-slip angle.

Step (2) A hybrid logical dynamic model is constructed based on the piecewise affine tire model through a mixed logical dynamic modeling method.

The hybrid logical dynamic model is constructed through the following steps.

Step (201) An ideal reference state parameter of the distributed drive electric vehicle is calculated based on real-time state information of the distributed drive electric vehicle. The real-time state information includes speed, yaw rate, center-of-mass side-slip angle and front-wheel steering angle.

Step (202) An error state equation is constructed based on the ideal reference state parameters.

Step (203) The hybrid logical dynamic model is constructed based on the error state equation and the piecewise affine tire model.

Step (3) An upper-layer hybrid model predictive controller is established based on the hybrid logical dynamic model. An additional yaw moment and an additional front-wheel steering angle are calculated based on the upper-layer hybrid model predictive controller through a mixed-integer quadratic programming algorithm.

Step (4) A lower-layer four-wheel torque optimal allocation controller is established based on the additional yaw moment. A wheel longitudinal force is calculated based on the lower-layer four-wheel torque optimal allocation controller with minimization of a tire load factor as an optimization objective through an active set method. The wheel drive torque is calculated based on the wheel longitudinal force.

Figure 6:
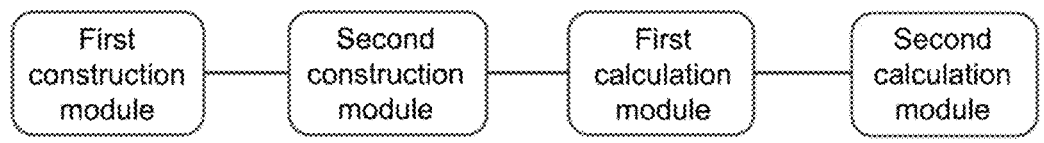
FIG. 6 is a structural diagram of the system for implementing the method provided herein according to an embodiment of the present disclosure.

As shown in FIG. 6, the present disclosure further provides a system for implementing the method described herein, which includes a first construction module, a second construction module, a first calculation module and a second calculation module. The first construction module is configured to perform piecewise linear fitting on the Magic Formula tire model to construct the piecewise affine tire model. The second construction module is configured to construct the hybrid logical dynamic model based on the piecewise affine tire model through the mixed logical dynamic modeling method. The first calculation module is configured to establish the upper-layer hybrid model predictive controller based on the hybrid logical dynamic model, and calculate the additional yaw moment and the additional front-wheel steering angle based on the upper-layer hybrid model predictive controller. The second calculation module is configured to establish the lower-layer four-wheel torque optimal allocation controller based on the additional yaw moment, and calculate the wheel drive torque using the lower-layer four-wheel torque optimal allocation controller.

The present disclosure further provides a device, including a memory and a processor. The memory is configured for storing a computer program. The processor is configured for executing the computer program to implement the method described above.

The processor is configured for executing the computer program to implement the method described above, including the following steps. A Magic Formula tire model is subjected to piecewise linear fitting to obtain a piecewise affine tire model. A hybrid logical dynamic model is constructed based on the piecewise affine tire model through a mixed logical dynamic modeling method. An upper-layer hybrid model predictive controller is established based on the hybrid logical dynamic model. An additional yaw moment and an additional front-wheel steering angle are calculated based on the upper-layer hybrid model predictive controller. A lower-layer four-wheel torque optimal allocation controller is established based on the additional yaw moment. A wheel drive torque is calculated based on the lower-layer four-wheel torque optimal allocation controller.

Alternatively, the processor is configured for executing the computer program to implement the functions of the modules in the system described above, including the following steps. The first construction module is configured to perform piecewise linear fitting on the Magic Formula tire model to construct the piecewise affine tire model. The second construction module is configured to construct the hybrid logical dynamic model based on the piecewise affine tire model through the mixed logical dynamic modeling method. The first calculation module is configured to establish the upper-layer hybrid model predictive controller based on the hybrid logical dynamic model, and calculate the additional yaw moment and the additional front-wheel steering angle based on the upper-layer hybrid model predictive controller. The second calculation module is configured to establish the lower-layer four-wheel torque optimal allocation controller based on the additional yaw moment, and calculate the wheel drive torque using the lower-layer four-wheel torque optimal allocation controller.

For example, the computer program can be divided into one or more modules/units, which are stored in the memory and executed by the processor to implement the method disclosed herein. The one or more modules/units may consist of a series of computer program instruction segments capable of performing preset functions. These instruction segments are used to describe the execution process of the computer program within a device for integrated control of handling stability of a distributed drive electric vehicle. For example, the computer program may be divided into a first construction module, a second construction module, a first calculation module and a second calculation module. The specific functions of each module are as follows. The first construction module is configured to perform piecewise linear fitting on the Magic Formula tire model to construct the piecewise affine tire model. The second construction module is configured to construct the hybrid logical dynamic model based on the piecewise affine tire model through the mixed logical dynamic modeling method. The first calculation module is configured to establish the upper-layer hybrid model predictive controller based on the hybrid logical dynamic model, and calculate the additional yaw moment and the additional front-wheel steering angle based on the upper-layer hybrid model predictive controller. The second calculation module is configured to establish the lower-layer four-wheel torque optimal allocation controller based on the additional yaw moment, and calculate the wheel drive torque using the lower-layer four-wheel torque optimal allocation controller.

The device for integrated control of handling stability of the distributed drive electric vehicle provided herein can be a computing device such as a desktop computer, laptop, personal digital assistant and cloud server. The device may include, but is not limited to, a processor and a memory. It should be understood by those skilled in the art that the above are exemplary embodiments and are not intended to limit the disclosure. The device may include components beyond those specifically mentioned, a combination of certain components, or other components. For example, the device provided herein may also include input/output devices, network access devices and buses.

The processor can be a Central Processing Unit (CPU), or it can be other general-purpose processors, Digital Signal Processors (DSP), Application-Specific Integrated Circuits (ASIC), Field-Programmable Gate Arrays (FPGA), or other programmable logic devices, discrete gates or transistor logic devices and discrete hardware components. The general-purpose processor can be a microprocessor, or the processor can be any conventional processor. The processor serves as a control center of the device provided herein, connecting various components of the device through different interfaces and wiring.

The memory is configured for storing the computer program and/or modules. The processor implements the various functions of the device provided herein by running or executing the computer program and/or modules stored in the memory, as well as accessing the data stored in the memory.

The memory primarily includes a program storage area and a data storage area. The program storage area is configured for storing an operating system, at least one application required for functions (such as audio playback and image display). The data storage area is configured for storing data created based on the use of the device (such as audio data and contacts). In addition, the memory can include high-speed random access memory and non-volatile memory, such as a hard disk, memory, plug-in hard drive, Smart Media Card (SMC), Secure Digital (SD) card, Flash Card, at least one disk storage device, flash memory device, or other volatile solid-state storage devices.

The present disclosure further provides a computer-readable storage medium configured for storing a computer program. The computer program is configured to be executed by a processor to implement the method disclosed herein.

In the case where the modules/units integrated by the system are implemented as software functional units and sold or used as standalone products, they can be stored on a computer-readable storage medium.

Based on this understanding, all or part of the processes in the aforementioned method can be implemented by instructing relevant hardware through a computer program. The computer program can be stored on a computer-readable storage medium. When the computer program is executed by a processor, the steps of the aforementioned integrated control method can be realized. The computer program includes computer program code, which can be in the form of source code, object code, executable file or a predefined intermediate form.

The computer-readable storage medium may include any entity or device capable of carrying the computer program code, such as a recording medium, a USB flash drive, a portable hard drive, a disk, an optical disc, a computer memory, Read-Only Memory (ROM), Random Access Memory (RAM), an electrical carrier signal, a telecommunication signal and a software distribution medium.

It should be noted that the contents included of the computer-readable storage medium can be appropriately added or omitted in accordance with the requirements of the legislation and patent practice in a given jurisdiction. For example, in some jurisdictions, based on legislation and patent practices, the computer-readable storage medium may not include electrical carrier signals and telecommunication signals.

The present disclosure will be further described with reference to the embodiments and accompanying drawings.

Embodiment

As mentioned in the background, under extreme conditions, when the tire enters nonlinear or even saturated regions, the decision-making and control accuracy of vehicle stability control will be greatly affected if the linear characteristics of the tire are taken into consideration. Additionally, the control system also struggles with a poor response speed due to the large computational complexity, which hinders the improvement of control precision.

In order to solve the above-mentioned problems, the present disclosure provides a method for integrated control of handling stability of a distributed drive electric vehicle. The design concept of the present disclosure is as follows. A piecewise affine method is employed to model a tire, with an input domain of the tire system state divided into a finite number of polyhedral regions, and an affine sub-model is obtained for each sub-region. However, during the stability control process of the distributed drive electric vehicle, adaptive discrete switching of various tire characteristics is inevitably achieved by switching between the sub-models of the piecewise affine tire model. In each subsystem formed by these sub-models, the state update process is a typical continuous dynamic process. Therefore, the stability control of the distributed drive electric vehicle can be viewed as a hybrid system with obvious hybrid dynamic characteristics, involving both continuous dynamics and discrete mode switching. The present disclosure utilizes a hybrid logical dynamic model for handling stability control of the distributed drive electric vehicle. A hierarchical integrated control strategy is adopted to establish an upper-layer hybrid model predictive controller and a lower-layer four-wheel torque optimal allocation controller. An additional yaw moment and a front-wheel steering angle are calculated using the upper-layer hybrid model predictive controller based on a hybrid model predictive control strategy. A wheel drive torque is calculated by the lower-layer four-wheel torque optimal allocation controller through a torque distribution optimization method that minimizes a tire load factor as an optimization objective. The method provided herein can address the issues of large computational burdens and poor response speed in the current control system, further enhancing the vehicle's lateral adhesion capability under extreme operating conditions and improving its resistance to lateral disturbances during driving.

The technical solutions of the present disclosure will be described in detail below with reference to the embodiments and accompanying drawings.

Figure 1:
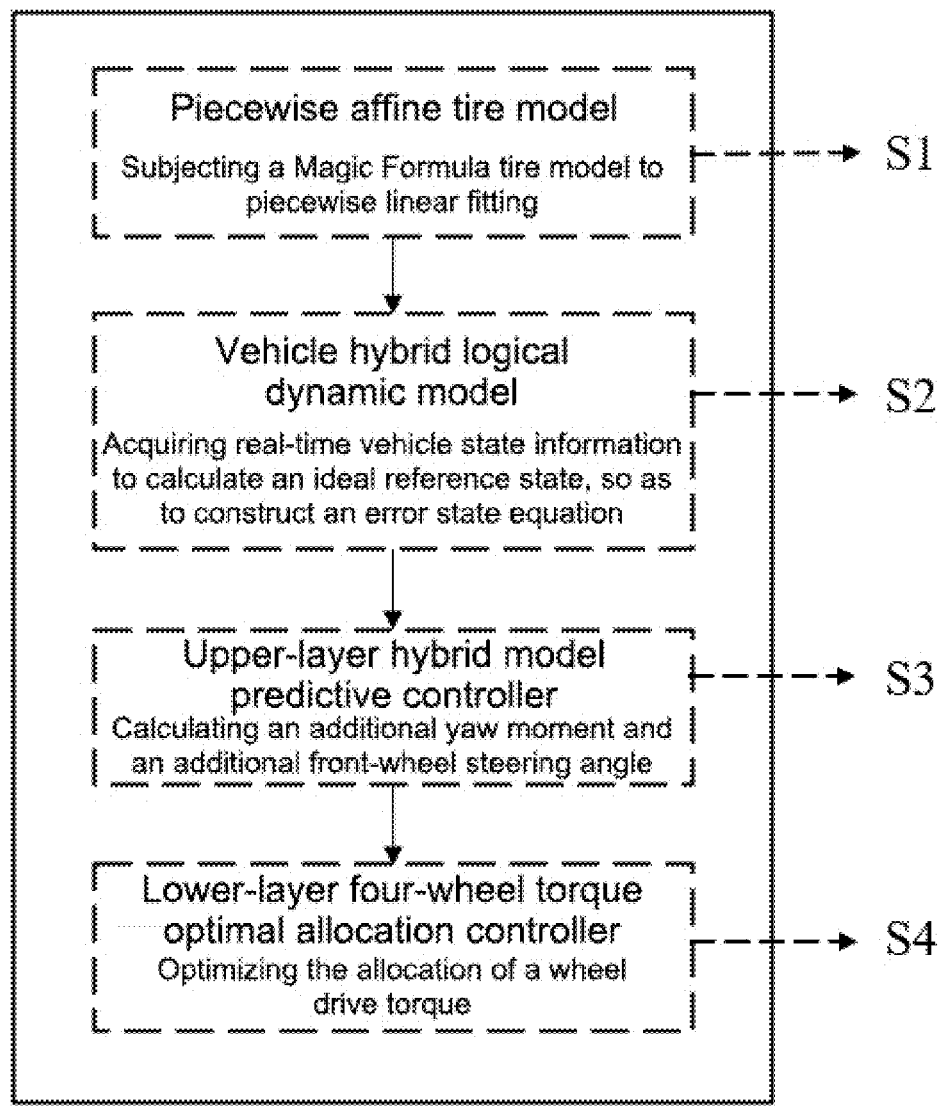
FIG. 1 is a flowchart 1 of a method for integrated control of handling stability of a distributed drive electric vehicle according to an embodiment of the present disclosure.

As shown in FIG. 1, the present disclosure provides the method for integrated control of handling stability of the distributed drive electric vehicle, which is performed as follows.

Step (1) A Magic Formula tire model is subjected to piecewise linear fitting to obtain a piecewise affine tire model, including the following steps.

Step (S1) The Magic Formula tire model is established. A tire lateral force is expressed as:

$$F_y = D \sin\{C \arctan[B\alpha - E(B\alpha - \arctan(B\alpha))]\}.$$

In the above formula, $F_y$ is a tire lateral force, B, C, D and E are a stiffness factor, a shape factor, a model peak factor and a model curvature factor, respectively, which can be obtained from the fitting parameters, and $\alpha$ is a tire side-slip angle.

Step (S2) A pure side-slip Magic Formula tire model is subjected to piecewise affine approximation using a piecewise linear function, i.e., a piecewise linear fitting process, so as to obtain the piecewise model symmetric about the origin, expressed as follows:

$$F_{yi} = \begin{cases} k_2\alpha_i + m_2, & \text{if } \alpha \in [-\alpha_{max}, -\alpha_2] \\ k_1\alpha_i + m_1, & \text{if } \alpha \in (-\alpha_2, -\alpha_1) \\ k_0\alpha_i + m_0, & \text{if } \alpha \in [-\alpha_1, \alpha_1] \\ k_3\alpha_i + m_3, & \text{if } \alpha \in (\alpha_1, \alpha_2) \\ k_4\alpha_i + m_4, & \text{if } \alpha \in [\alpha_2, \alpha_{max}] \end{cases}.$$

Figure 3:
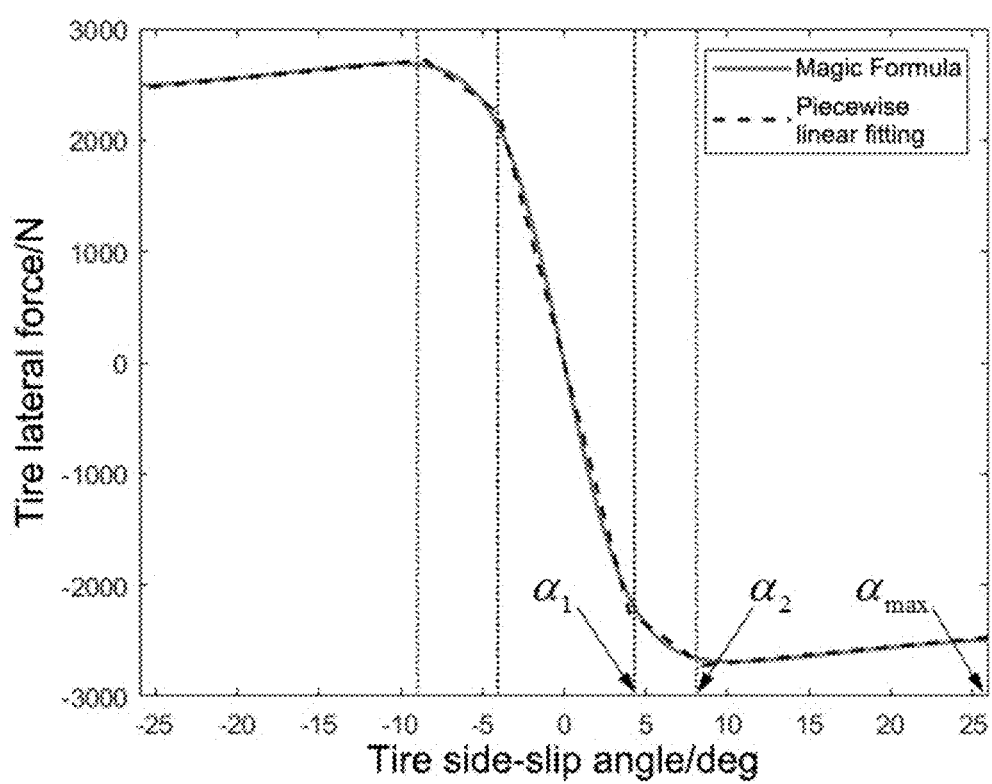
FIG. 3 is a piecewise affine result of Magic Formula tire lateral force according to an embodiment of the present disclosure.

In the above formula, $i \in \{f, r\}$ represents front and rear equivalent wheels of a degree-of-freedom dynamic model of the vehicle, $\alpha_1$ is a segment point where the tire enters the nonlinear region, $\alpha_2$ is a segment point where the tire enters the saturation region, $\alpha_{max}$ is a maximum side-slip angle, $k_0$, $k_1$, $k_2$, $k_3$, $k_4$, $m_0$, $m_1$, $m_2$, $m_3$ and $m_4$ are slopes and intercepts of each piecewise function, respectively. The comparison between a piecewise affine model curve and an original Magic Formula tire curve is shown in FIG. 3. As can be seen, the front tire lateral force consists of five linear control regions, and the rear tire lateral force also consists of five linear control regions. Therefore, the piecewise linear system has a total of 25 linear control regions. That is, the tire lateral force varies dynamically between $[-\alpha_{max}, -\alpha_2]$, $(-\alpha_2, \alpha_1)$, $[-\alpha_1, \alpha_1]$, $(\alpha_1, \alpha_2)$ and $[\alpha_2, \alpha_{max}]$, where $\alpha_1$, $\alpha_2$ and $\alpha_{max}$ are the segment points of piecewise linearization of the tire.

When $\alpha \in [-\alpha_{max}, -\alpha_2]$ or $\alpha \in [\alpha_2, \alpha_{max}]$, the lateral tire force is in a saturated state. Under the influence of the tire force boundary effect, it is difficult to generate the yaw moment by changing the tire side-slip angle.

When $\alpha \in (-\alpha_2, -\alpha_1)$ or $\alpha \in (\alpha_1, \alpha_2)$, the lateral tire force is in a critical state. Increasing the tire side-slip angle will lead to the saturation of the tire force region, while decreasing the tire side-slip angle can restore the tire force to a linear state.

When $\alpha \in [-\alpha_1, \alpha_1]$, the lateral tire force is in a linear state, and changing the tire side-slip angle can generate a certain yaw moment.

The piecewise affine model established above is represented as a set of mixed-integer linear inequality constraints by introducing auxiliary variables, thereby converting it into a piecewise affine model with subsystems that can automatically switch. Auxiliary discrete variables $\delta_i \in \{0,1\}$ is introduced, where $i \in I$ and $I = \{1, 2, \ldots, 25\}$. The logical proposition expression of the piecewise affine model is as follows:

$$[\alpha_{i\,min} \leq \alpha \leq \alpha_{i\,max}] \leftrightarrow [\delta_i(k) = 1].$$

In the above formula, $\alpha_{i\ min}=[\alpha_{ml}, \alpha_{nl}]$ and $\alpha_{i\ max}=[\alpha_{mu}, \alpha_{nu}]$, where i is any linear control region, m and n correspond to piecewise linear ranges, respectively, i.e., m, n={1, 2, . . . , 5}, l and u are a minimum value and a maximum value of the segment region where the tire is currently located, respectively. The expression $\alpha=[\alpha_f, \alpha_r]$ is a tire side-slip angle of the front and the rear tires, it means that when the front and the rear tire side-slip angles fall within a specific combination of linear regions, the corresponding auxiliary discrete variable is triggered. In the logical proposition expression generated by the piecewise affine model, ↔ is a logical operator for equivalence.

According to the conversion relationship between the composite logical proposition and the linear inequality, the piecewise affine tire model can be transformed into the following linear inequality:

$$\begin{cases} -\alpha + \alpha_{i\ min} \leq M_{i1}(1 - \delta_i(k)) \\ -\alpha + \alpha_{i\ min} \geq \varepsilon + (m_{i1} - \varepsilon)\delta_i(k) \\ \alpha - \alpha_{i\ max} \leq M_{i2}(1 - \delta_i(k)) \\ \alpha - \alpha_{i\ max} \geq \varepsilon + (m_{i2} - \varepsilon)\delta_i(k) \end{cases}.$$

In the above formula, $M_{i1}$ and $m_{i1}$ are a maximum value and a minimum value of the expression $-\alpha+\alpha_{imin}$, respectively. $M_{i2}$ and $m_{i2}$ are a maximum value and a minimum value of the expression $\alpha-\alpha_{imax}$, respectively. $\varepsilon$ is a tolerance error, and when the value exceeds this tolerance, it indicates a constraint violation.

In addition, all auxiliary discrete variables must satisfy the exclusive OR condition, as follows:

$$\delta_1(k) \oplus \delta_2(k) \oplus \ldots \oplus \delta_{25}(k) = 1.$$

The equation described above can be transformed into a integer linear inequality, expressed as:

$$0.9999 \leq \sum_{i=1}^{25} \delta_i(k) \leq 1.0001.$$

Step (2) A hybrid logical dynamic model is constructed based on the piecewise affine tire model through a mixed logical dynamic modeling method, including the following steps.

Figure 2:
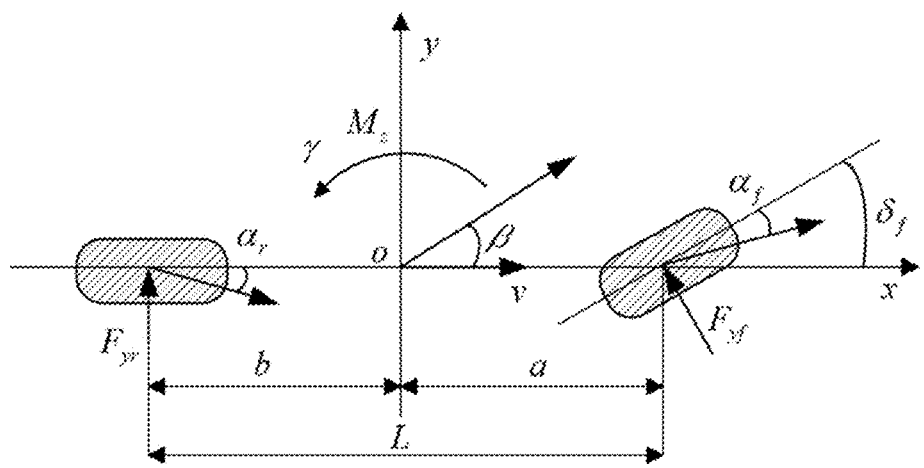
FIG. 2 is a nonlinear two-degree-of-freedom vehicle dynamics model according to an embodiment of the present disclosure.

Step (S3) FIG. 2 illustrates a nonlinear two-degree-of-freedom vehicle dynamics model, which is used to obtain an ideal reference vehicle state and lay a foundation for establishing an error state-space equation.

The established two-degree-of-freedom dynamics model is as follows:

$$\dot{\beta} = \frac{F_{yf}\cos\delta_f + F_{yr}}{m_s v} - \gamma, \text{ and}$$

$$\dot{\gamma} = \frac{aF_{yf}\cos\delta_f - bF_{yr} + \Delta M_z}{I_z}.$$

In the above formula, $m_s$ is a vehicle mass, a is a distance from center-of-mass to the front axle of the vehicle, b is a distance from center-of-mass to the rear axle of the vehicle, v is a longitudinal velocity of the vehicle's center-of-mass, $I_z$ is a moment of inertia of the vehicle about the z-axis. $F_{yf}$ and $F_{yr}$ are total lateral forces at the front and rear wheels, respectively, $\delta_f$ is a front-wheel steering angle, $\beta$ is a yaw rate of the vehicle's center-of-mass, $\gamma$ is a center-of-mass side-slip angle of the vehicle, $\Delta M_z$ is an additional yaw moment generated by differential driving or braking.

The tire side-slip angles of the front and rear wheels are approximately as follows:

$$\alpha_f = \beta + \frac{a\gamma}{v} - \delta_f,$$

$$\alpha_r = \beta - \frac{b\gamma}{v}.$$

The real-time state information includes speed, yaw rate, center-of-mass side-slip angle and front-wheel steering angle. The ideal reference state parameters are calculated based on the front-wheel steering angle and the longitudinal velocity of the vehicle. Based on the linear two-degree-of-freedom vehicle dynamics model, under the condition of small lateral acceleration, the desired yaw rate $\gamma_d$ can be derived under a steady-state cornering condition, and center-of-mass side-slip angle $\beta_d$ is set to 0. The expression for the ideal value is as follows:

$$\gamma_d = \min\left\{\left|\frac{v\delta_f}{L(1+Kv^2)}\right|, \left|\frac{\mu}{v}g\right|\right\}\text{sgn}(\delta_f),$$

$$\beta_d = 0.$$

In the above formula, L=a+b is a wheelbase of the whole vehicle, $\mu$ is a road adhesion coefficient, $$K = \frac{m_s}{L^2}\left(\frac{a}{k_r} - \frac{b}{k_f}\right)$$

is a vehicle stability factor, $k_f$ and $k_r$ are cornering stiffness of the front and rear tires, respectively, a is a distance from the front axle to the vehicle's center-of-mass, b is a distance from the rear axle to the vehicle's center-of-mass and sgn is a signum function.

Step (S4) Based on the ideal reference state obtained in step (S3), the error state equation is constructed. T is a discrete sampling period. The model is discretized using a forward Euler method. The discrete system state-space can be expressed as:

$$\begin{cases} x(k+1) = A_{mn}x(k) + B_{mn}u(k) + f_{mn} \\ y(k+1) = Cx(k) + Du(k) + g_{mn} \end{cases}.$$

In the above formula, m refers to the segment of the piecewise affine model where the front tire's side-slip angle ($\alpha_f$) lies, n refers to the segment of the piecewise affine model where the rear tire's side-slip angle ($\alpha_r$) lies, $A_{mn}$, $B_{mn}$, C, D, $f_{mn}$ and $g_{mn}$ are coefficient matrices of the state-space equation. Each matrix is specifically as follows:

$$A_{mn} = \begin{bmatrix} T\frac{k_m+k_n}{m_s v}+1 & T\frac{ak_m-bk_n}{m_s v^2}-T \\ T\frac{ak_m-bk_n}{I_z} & T\frac{a^2k_m+b^2k_n}{I_z v_x}+1 \end{bmatrix},$$

-continued $$B_{mn} = \begin{bmatrix} -T\dfrac{k_m}{m_s v} & 0 \\ -T\dfrac{ak_m}{I_z} & T\dfrac{I}{I_z} \end{bmatrix} \quad C = \begin{bmatrix} 1 & 0 \\ 0 & 1 \end{bmatrix} \quad D = \begin{bmatrix} 0 & 0 \\ 0 & 0 \end{bmatrix},$$

$$f_{mn} = \begin{bmatrix} \dfrac{m_m + m_n}{m_s v} \\ \dfrac{m_m - m_n}{I_z} \end{bmatrix}, \quad g_{mn} = 0.$$

Based on the piecewise affine model with subsystems that can automatically switch, the hybrid logical dynamic model is established.

The above error state-space equation combined with the piecewise affine tire model is rewritten as a combination of linear terms and If-Then-Else rules by introducing auxiliary discrete variables $\delta_i \in \{0,1\}$, where $i \in I$ and $I = \{1, 2, \ldots, 25\}$. The expression is as follows:

$$\begin{cases} x_1(k+1) = \begin{cases} A_1 x(k) + B_1 u(k) + f_1(k), & \text{if } (\delta_1(k) = 1) \\ 0, & \text{otherwise} \end{cases} \\ \vdots \\ x_{25}(k+1) = \begin{cases} A_{25} x(k) + B_{25} u(k) + f_{25}(k), & \text{if } (\delta_{25}(k) = 1) \\ 0, & \text{otherwise} \end{cases} \\ x(k+1) = \sum_{i=1}^{25} x_i(k+1) \end{cases}$$

According to the mixed logical dynamic modeling method of hybrid control systems, the constraints involved in the above equation are expressed as logical propositions and transformed into linear inequalities involving logical variables. The above equation indicates that when the system state enters the i-th linear control region, the corresponding state equation is equivalent to $\delta_i(k) = 1$.

After the transformation, when the system enters the i-th region at a certain moment, it can be expressed as:

$$x_i(k+1) = \sum_{i=1}^{25} (A_i x(k) + B_i u(k) + f_i(k)) \delta_i(k).$$

In order to derive a propositional logic expression that satisfies the above constraint conditions of the above formula, an auxiliary continuous variable $z_i(k) = \sum_{i=1}^{25} (A_i x(k) + B_i u(k) + f_i(k)) \delta_i(k)$ is introduced.

The propositional logic expression can be derived from the above formula, and is expressed as follows:

$$\begin{cases} [\delta_i(k) = 0] \rightarrow [z_i(k) = 0] \\ [\delta_i(k) = 1] \rightarrow [z_i(k) = A_i x(k) + B_i u(k) + f_i(k)] \end{cases}.$$

In the above formula, $\rightarrow$ is the logical operator representing the implication relationship.

Based on the conversion relationship between the propositional logic expression obtained by multiplying logical variables and continuous variables and the linear inequalities, a mixed-integer inequality constraint is expressed as follows:

$$\begin{cases} z_i(k) \leq M_i \delta_i(k) \\ z_i(k) \geq m_i \delta_i(k) \\ z_i(k) \leq A_i x(k) + B_i u(k) + f_i - m_i(1 - \delta_i(k)) \\ z_i(k) \geq A_i x(k) + B_i u(k) + f_i - M_i(1 - \delta_i(k)) \end{cases}.$$

In the above formula, $M_i = \max (A_i x(k) + B_i u(k) + f_i)$ and $m_i = \min (A_i x(k) + B_i u(k) + f_i)$ are the maximum and minimum values of each state equation in the constraints, respectively.

In summary, considering the above mixed-integer linear inequalities and the piecewise linear state equations of the system, a standard form of the hybrid logical dynamic model of the two-degree-of-freedom vehicle dynamics model is expressed as follows:

$$x(k+1) = A_1 x(k) + B_1 u(k) + B_2 \delta(k) + B_3 z(k),$$

$$y(k) = Cx(k) + D_1 u(k) + D_2 \delta(k) + D_3 z(k), \text{ and}$$

$$E_1 \delta(k) + E_2 z(k) \leq E_3 x(k) + E_4 u(k) + E_5.$$

In the above formula, A, $B_1$, $B_2$, $B_3$, C, $D_1$, $D_2$, $D_3$, $E_1$, $E_2$, $E_3$, $E_4$ and $E_5$ are calculated according to the error state-space equation and the mixed-integer linear inequality.

Step (3) An upper-layer hybrid model predictive controller is established based on the hybrid logical dynamic model; and an additional yaw moment and an additional front-wheel steering angle are calculated based on the upper-layer hybrid model predictive controller, including the following steps.

Step (S5) An upper-layer hybrid model predictive controller is established based on the hybrid logical dynamic model. The upper-layer hybrid model predictive controller combines the piecewise affine model and the constrained hybrid logical dynamic model, which are suitable for optimization control, as the prediction model for the hybrid model predictive control. Then, the mixed-integer quadratic programming algorithm is adopted to conduct the receding horizon optimization solution.

Let t be the current moment, X(t) be the current state variable (obtained directly through measurement or through a state observer). In the case of t=0, X(t) is the initial state of the system, the optimization control problem solved by the hybrid model predictive control algorithm can be expressed as follows:

$$\min J = \sum_{K=0}^{U-1} \|u(k \mid t) - u_{ref}\|_R^2 + \sum_{K=0}^{P-1} \|y(k \mid t) - y_{ref}\|_Q^2 \text{ and}$$

$$\text{s.t.} \begin{cases} \text{MLD model} \\ u_{min} \leq u(k \mid t) \leq u_{max}, k = 1, LU - 1 \\ y_{min} \leq y(k \mid t) \leq y_{max}, k = 1, LP - 1 \end{cases}$$

In the above formula, P is a prediction horizon, U is a control horizon, Q and R are the weights for output variable and control variable, respectively. $R = \text{diag}(r_1, r_2)$, where $r_1$ and $r_2$ are the weight values of the active front-wheel steering angle and the direct yaw moment of the control variables, respectively. $Q = \text{diag}(q_1, q_2)$, where $q_1$ and $q_2$ are the weight values of the real-time yaw rate and the center-of-mass side-slip angle of the vehicle of the output variables, respectively. y is a reference value for the output variable, u is a reference value for the control variable, $\gamma_{ref} = 0$ and $u_{ref} = 0$. $u_{min}$ and $u_{max}$ are the lower and upper limits of the control variables, respectively, that is, the physical constraints of the vehicle's front-wheel steering angle and direct yaw moment. $y_{min}$ and $y_{max}$ are the lower and upper limits of the output variables, respectively. Additionally, in this embodiment, the norm is taken as two.

At each sampling moment t, the above process can be transformed into a mixed-integer quadratic programming problem for solution to obtain a set of optimal control sequences, that is, $\zeta(t)=[u_0, \ldots, u_{U-1}, \delta_0, \ldots, \delta_{U-1}, z_0, \ldots, z_{U-1}]^T$, where the first element $u_0$ is taken as the optimal control input at the current moment.

For the convenience of optimization solution, the output Y(t) within the prediction horizon, the control input U(t), the auxiliary discrete variable Δ(t), the auxiliary continuous variable Z(t), and their weighted matrices $\overline{Q}$ and $\overline{R}$ are specifically defined as follows:

$$Y(t) = \begin{bmatrix} y(t|t) \\ y(t+1|t) \\ \vdots \\ y(t+P-1|t) \end{bmatrix}, U(t) = \begin{bmatrix} u(t|t) \\ u(t+1|t) \\ \vdots \\ u(t+U-1|t) \end{bmatrix},$$

$$\Delta(t) = \begin{bmatrix} \delta(t|t) \\ \delta(t+1|t) \\ \vdots \\ \delta(t+U-1|t) \end{bmatrix}, Z(t) = \begin{bmatrix} z(t|t) \\ z(t+1|t) \\ \vdots \\ z(t+U-1) \end{bmatrix},$$

$$\overline{Q} = \begin{bmatrix} Q_1 & 0 & 0 & 0 \\ 0 & Q_2 & 0 & 0 \\ 0 & 0 & \ddots & 0 \\ 0 & 0 & 0 & Q_P \end{bmatrix} \text{ and } \overline{R} = \begin{bmatrix} R_1 & 0 & 0 & 0 \\ 0 & R_2 & 0 & 0 \\ 0 & 0 & \ddots & 0 \\ 0 & 0 & 0 & R_U \end{bmatrix}.$$

In the above formula, P is the prediction horizon and U is the control horizon.

Thus, the optimization objective function can be expressed as:

$$J(\zeta, x(t)) = Y^T(t)\overline{Q}y(t) + U^T(t)\overline{R}U(t).$$

Meanwhile, the prediction model can be expressed as:

$$\begin{cases} Y(t) = \overline{C}x(t) + \overline{D}_u U(t) + \overline{D}_\delta \Delta(t) + \overline{D}_z Z(t) \\ \overline{E}_\delta \Delta(t) + \overline{E}_z Z(t) \le \overline{E}_u U(t) + \overline{E}_4 x(t) + \overline{E}_5 \end{cases}.$$

In the above formula, $\overline{C}, \overline{D}_u, \overline{D}_\delta, \overline{D}_z, \overline{E}_\delta, \overline{E}_z, \overline{E}_u, \overline{E}_4$ and $\overline{E}_5$ are matrices of appropriate dimensions obtained from the recursion of the original linear inequalities.

The prediction model is substituted into the objective function and simplified, the following expression can be obtained:

$$J(\xi, x(t)) = \frac{1}{2}\xi^T H\xi + f^T\xi + x(t)^T Gx(t).$$

In the above formula, $\zeta(t)$, G, H and $f^T$ are intermediate variables, $u_c$ is a control output matrix, lb and ub are the maximum and minimum values of the longitudinal force output, respectively. Each matrix is specifically expressed as follows:

$$\xi(t) = \begin{bmatrix} U(t) \\ \Delta(t) \\ Z(t) \end{bmatrix}, G = [\overline{C}^T \overline{Q}\overline{C}],$$

$$H = 2\begin{bmatrix} \overline{D}_u^T \overline{Q}\overline{D}_u + \overline{R} & \overline{D}_\delta^T \overline{Q}\overline{D}_u & \overline{D}_z^T \overline{Q}\overline{D}_u \\ \overline{D}_u^T \overline{Q}\overline{D}_\delta & \overline{D}_\delta^T \overline{Q}\overline{D}_\delta & \overline{D}_z^T \overline{Q}\overline{D}_\delta \\ \overline{D}_u^T \overline{Q}\overline{D}_z & \overline{D}_\delta^T \overline{Q}\overline{D}_z & \overline{D}_z^T \overline{Q}\overline{D}_z \end{bmatrix}, \text{ and}$$

$$f^T = 2x(t)^T [\overline{C}^T \overline{Q}\overline{D}_u \quad \overline{C}^T \overline{Q}\overline{D}_\delta \quad \overline{C}^T \overline{Q}\overline{D}_z].$$

The linear inequality terms in the prediction model can be further expressed as:

$$S\xi(t) \le \overline{E}_5 + \overline{E}_4 x(t).$$

In the above formula, $S=[\overline{E}_u \; \overline{E}_\delta \; \overline{E}_z]$.

Since the term $x(t)^T Gx(t)$ is known at the current time, the mixed-integer quadratic programming problem can be further expressed as:

$$J \triangleq \min_\xi \left(\frac{1}{2}\xi^T H\xi + f^T\xi\right),$$

s.t. $S\xi(t) \le \overline{E}_5 + \overline{E}_4 x(t).$

The above problem can be solved using a Branch & Bound algorithm to obtain the output of the upper-layer hybrid model predictive controller, i.e., the additional yaw moment and the additional front-wheel steering angle.

Step (4) A lower-layer four-wheel torque optimal allocation controller is established based on the additional yaw moment; and a wheel drive torque is calculated based on the lower-layer four-wheel torque optimal allocation controller, including the following steps.

Step (S6) The control input $u_0 = \{\Delta\delta_f, \Delta M_z\}$ calculated by the upper-layer hybrid model predictive controller includes three control variables. Among them, the additional front-wheel steering angle can be directly sent to a steer-by-wire system for execution after processing, while the additional yaw moment $\Delta M_z$ is a generalized quantity that needs to be converted into the drive or braking forces of the four wheels according to a specific allocation method.

In actual vehicle operation, under high tire load conditions, the corresponding tire reserve adhesion coefficient is smaller, leading to a higher possibility of vehicle instability. Therefore, in order to cooperate with the upper-layer controller for achieving good stability under extreme operating conditions, the embodiment provided herein adopts a drive torque optimization allocation method with minimization of the tire load factor as the optimization objective.

Based on the formulas of the adhesion load ratios of the four tires on the road surface, the objective function is expressed as follows:

$$\min J_m = \sum_{i=1}^4 C_i \frac{F_{xi}^2 + F_{yi}^2}{(\mu_i F_{zi})^2}.$$

In the above formula, $C_i$ is a weight coefficient for the utilization rate of each wheel, $\mu_i$ is a longitudinal rolling friction coefficient, $F_{zi}$ is the current vertical load of each wheel, $F_{xi}$ and $F_{yi}$ are the longitudinal and lateral forces of each wheel, respectively. i=1, 2, 3, 4 represents the left front wheel, right front wheel, left rear wheel and right rear wheel of the vehicle, respectively.

Since the allocation of the vehicle torque has a relatively small impact on the lateral force, and the front-wheel steering angle is small during the steering process, resulting in an insignificant lateral force, the tire load factor can be expressed as follows:

$$\min J_m = \sum_{i=1}^{4} C_i \frac{F_{xi}^2}{(\mu F_{zi})^2},$$

constraints:

$$\begin{cases} (F_{x1} + F_{x2})\cos\delta_f + F_{x3} + F_{x4} = F_x \\ \frac{d}{2}(F_{x2} - F_{x1})\cos\delta_f + (F_{x2} - F_{x1})a\sin\delta_f + \frac{d}{2}(F_{x4} - F_{x3}) = \Delta M_z \\ -\mu_i F_{zi} \leq F_{xi} \leq \mu_i F_{zi} \\ -F_{xmax} \leq F_{xi} \leq F_{xmax} \end{cases}.$$

In the formula, $C_i$ is the weight coefficient for the utilization rate of each wheel, $F_{x_i}$ is the longitudinal force of each wheel, $F_{z_i}$ is the vertical load of each wheel, $F_x$ is a total longitudinal required force, $\mu_i$ is the longitudinal rolling friction coefficient, d is a vehicle track width, of is the front-wheel steering angle, $F_{xmax}$ is the longitudinal force corresponding to the peak torque of the motor, $\Delta M_z$ is the additional yaw moment, and i=1, 2, 3, 4 represent the left front wheel, the right front wheel, the left rear wheel and the right rear wheel of the vehicle, respectively.

The objective function and its constraints are sorted out and transformed into a standard form of quadratic programming, the following expression can be obtained:

$$\min_{u_c} J = \frac{1}{2} u_c^T W_u u_c,$$

s.t. $A_{eq} u_c = b_{eq}$  $lb \leq u_c \leq ub$.

In the above formula, $W_u$, $A_{eq}$ and $b_{eq}$ are intermediate variables, $u_c$ is the control output matrix, lb and ub are the maximum and minimum values of the longitudinal force output, respectively, and they are specifically expressed as:

$$W_u = \text{diag}\left(\frac{c_i}{(\mu_i F_{zi})^2}\right),$$

$$u_c = [F_{x1} \ F_{x2} \ F_{x3} \ F_{x4}]^T,$$

$$A_{eq} = \begin{bmatrix} \cos\delta_f & \cos\delta_f & 1 & 1 \\ -\frac{d}{2} + a\sin\delta_f & \frac{d}{2} + a\sin\delta_f & \frac{d}{2} & -\frac{d}{2} \end{bmatrix} b_{eq} = [F_x \ M_z]^T,$$

$$b_{eq} = [F_x \ M_z]^T,$$

$$lb = \max(-\mu F_{zi}, -F_{max}), \text{ and}$$

$$ub = \min(\mu F_{zi}, F_{max}).$$

The above quadratic programming problem is solved using an active set method to obtain the longitudinal forces on the four wheels, which are then used to calculate the corresponding wheel drive torques for the drive motors.

Figure 4:
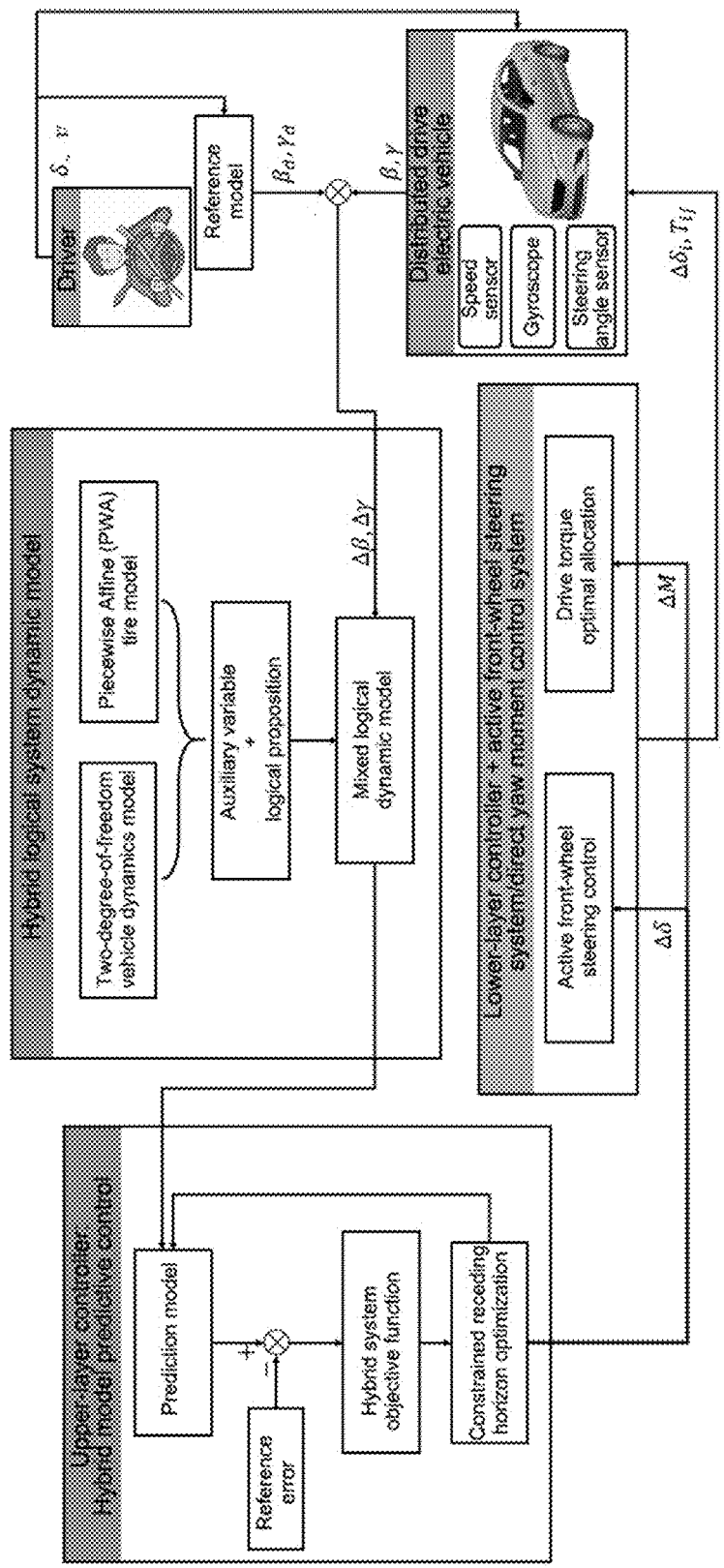
FIG. 4 is a block diagram of a system for implementing the method provided herein according to an embodiment of the present disclosure.

As shown in FIG. 4, the present embodiment also provides a system for implementing the method provided herein, which is based on the hybrid model predictive control. The system provided herein is designed with an upper-layer controller and a lower-layer controller. The upper-layer controller is configured to calculate and output the additional yaw moment and the front-wheel steering angle by using the hybrid model predictive control strategy based on the ideal reference state and the actual vehicle state. The lower-layer controller is configured to allocate the drive torque with minimization of the tire load factor as the optimization objective to achieve handling stability control of the distributed drive electric vehicle.

Based on the above, the present disclosure provides the method and related devices for integrated control of handling stability of the distributed drive electric vehicle. The non-linear vehicle dynamics model is transformed into a hybrid logical dynamic model, and the finite time domain optimization control of the vehicle hybrid logical dynamic model is studied based on the model predictive control theory. The method disclosed herein can significantly reduce the computational burdens of the controller, while further enhancing the lateral adhesion capability of the vehicle under extreme operating conditions and improving its resistance to lateral disturbances during driving.

Described above are merely preferred embodiments of the present disclosure, and are not intended to limit the scope of the present disclosure. It should be understood that various modifications, changes and replacements made by those skilled in the art without departing from the spirit of the disclosure shall fall within the scope of the present disclosure defined by the appended claims.

What is claimed is:

1. A method for integrated control of handling stability of a distributed drive electric vehicle, comprising:
   (1) subjecting a Magic Formula tire model to piecewise linear fitting to obtain a piecewise affine tire model;
   (2) constructing a hybrid logical dynamic model based on the piecewise affine tire model through a mixed logical dynamic modeling method;
   (3) establishing an upper-layer hybrid model predictive controller based on the hybrid logical dynamic model, and calculating an additional yaw moment and an additional front-wheel steering angle based on the upper-layer hybrid model predictive controller;
   (4) establishing a lower-layer four-wheel torque optimal allocation controller based on the additional yaw moment, and obtaining a wheel longitudinal force of four wheels based on the lower-layer four-wheel torque optimal allocation controller; and obtaining a wheel drive torque based on the wheel longitudinal force of four wheels; and
   directly sending the additional front-wheel steering angle to a steer-by-wire system for execution; and acting the wheel drive torque on a drive motor, thereby performing the integrated control of handling stability of the distributed drive electric vehicle;
   wherein the hybrid logical dynamic model is constructed through steps of:
   (1) calculating an ideal reference state parameter of the distributed drive electric vehicle based on real-time state information of the distributed drive electric vehicle, wherein the real-time state information comprises speed, yaw rate, center-of-mass side-slip angle and front-wheel steering angle;
   (2) constructing an error state equation based on the ideal reference state parameter; and
   (3) constructing the hybrid logical dynamic model based on the error state equation and the piecewise affine tire model.

2. The method of claim 1, wherein the Magic Formula tire model is constructed based on a stiffness factor, a shape factor, a model peak factor, a model curvature factor and a tire side-slip angle.

3. The method of claim 1, wherein the additional yaw moment and the additional front-wheel steering angle are calculated based on the upper-layer hybrid model predictive controller through a mixed-integer quadratic programming algorithm.

4. The method of claim 1, wherein the wheel drive torque is calculated through steps of:
   calculating the wheel longitudinal force based on the lower-layer four-wheel torque optimal allocation controller with minimization of a tire load factor as an optimization objective; and
   calculating the wheel drive torque based on the wheel longitudinal force.

5. The method of claim 4, wherein the wheel longitudinal force is calculated based on the lower-layer four-wheel torque optimal allocation controller with minimization of the tire load factor as the optimization objective through an active set method.

6. A system for implementing the method of claim 1, comprising:
   a first construction module;
   a second construction module;
   a first calculation module; and
   a second calculation module;
   wherein the first construction module is configured to perform piecewise linear fitting on the Magic Formula tire model to construct the piecewise affine tire model;
   the second construction module is configured to construct the hybrid logical dynamic model based on the piecewise affine tire model through the mixed logical dynamic modeling method;
   the first calculation module is configured to establish the upper-layer hybrid model predictive controller based on the hybrid logical dynamic model, and calculate the additional yaw moment and the additional front-wheel steering angle based on the upper-layer hybrid model predictive controller; and
   the second calculation module is configured to establish the lower-layer four-wheel torque optimal allocation controller based on the additional yaw moment, and calculate the wheel longitudinal force of four wheels using the lower-layer four-wheel torque optimal allocation controller; and obtain the wheel drive torque based on the wheel longitudinal force of four wheels; and
   wherein the additional front-wheel steering angle is directly sent to the steer-by-wire system for execution, and the wheel drive torque is acted on the drive motor, thereby performing the integrated control of handling stability of the distributed drive electric vehicle.

7. A device, comprising:
   a memory; and
   a processor;
   wherein the memory is configured for storing a computer program; and
   the processor is configured for executing the computer program to implement the method of claim 1.

8. A non-transitory computer-readable storage medium, wherein the computer-readable storage medium is configured for storing a computer program; and the computer program is configured to be executed by a processor to implement the method of claim 1.

* * * * *